(12) United States Patent
Lagerström et al.

(10) Patent No.: US 6,215,583 B1
(45) Date of Patent: Apr. 10, 2001

(54) SYSTEM WITH FEEDBACK CONTROLLED OPTICAL AMPLIFIERS

(75) Inventors: Bo Lagerström, Hägersten; Gunnar Forsberg, Stockholm; Magnus Öberg, Hägersten; Dag Bonnedal, Enskede; Bengt Johansson, Hägersten, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/254,712
(22) PCT Filed: Sep. 11, 1997
(86) PCT No.: PCT/SE97/01535
§ 371 Date: Nov. 19, 1999
§ 102(e) Date: Nov. 19, 1999
(87) PCT Pub. No.: WO98/11681
PCT Pub. Date: Mar. 19, 1998

(30) Foreign Application Priority Data

Sep. 13, 1996 (SE) .................................. 9603337

(51) Int. Cl.[7] ...................................................... H01S 3/00
(52) U.S. Cl. .......................... 359/341; 359/160; 359/124
(58) Field of Search ................................ 359/341, 160, 359/124

(56) References Cited

U.S. PATENT DOCUMENTS

| 4,991,229 | 2/1991 | Nelson et al. |
|---|---|---|
| 5,864,423 | * 1/1999 | Kosaka ............................. 359/341 |
| 5,870,217 | 2/1999 | Itou et al. |
| 6,023,366 | 2/2000 | Kinoshita . |

FOREIGN PATENT DOCUMENTS

| 0552937A1 | 7/1993 | (EP) . |
|---|---|---|
| 0 637 148 A1 | 2/1995 | (EP) . |
| 2 294 170 | 4/1996 | (GB) . |

* cited by examiner

*Primary Examiner*—Mark Hellner
(74) *Attorney, Agent, or Firm*—Burns, Doane, Swecker & Mathis, L.L.P.

(57) ABSTRACT

The present invention relates to an optical system with an optical amplifier having at least one input and output, a control circuit for controlling the output power of the amplifier with the aid of an output process demand signal (PD) from a control means. The control circuit comprises control means, a detector block and a means for tapping off light from an input or an output of the optical amplifier to the detector block. According to the invention, at least one check signal (A) is disposed to be sent in at least one check signal channel which passes through the optical amplifier. The detector block is configured to measure the amplitude of the control signal(s).

30 Claims, 4 Drawing Sheets

SYSTEM WITH FEEDBACK CONTROLLED OPTICAL AMPLIFIERS

TECHNICAL FIELD

The present invention relates to a system with optical amplifiers and in particular to a system where the transmitted signals are wavelength division multiplexed (WDM), and to a control process in this system.

THE STATE OF THE ART

Wavelength division multiplexing (WDM) is a technology which permits transmission of a number of optical signals through an optical fibre by using different separated light wavelengths. In this manner, the information carrying capacity can be increased significantly. The capacity depends on the band width of the fibre, the number of the wavelength channels used and how close the wavelength channels can lie to each other in practice. The signal at each wavelength travels through the fibre independently of the other signals, so each signal represents a discrete channel of large band width.

When signals are sent long distances, the signals must be regenerated or amplified at repeated intervals. In the latter alternative, it is possible to use optical amplifiers for example. An optical amplifier can consist of erbium doped optical fibre which is pumped by a high power semiconductor laser, called a pump laser in the following.

The optical amplifier differs from its electrical counterpart in that the optical amplifier attempts to keep the output power constant, while the electrical amplifier has a constant amplification.

The fact that the output power is constant presents problems if the number of channels is changed, intentionally or because of faults. It can therefore be desirable to be able to control the output power. It is previously known to control the amplification in an optical amplifier with the aid of pilot tones (see EP 0 637 148 A1). An identifying pilot tone is modulated on each multiplexed wavelength. Each amplifier in the system determines from the pilot tone the total number of wavelengths which are sent and provides a corresponding regulation of the amplification by the amplifier. Either feed-forward control or feedback control can be used. The patent document also indicates that, in addition to counting the number of channels, the amplitude of the pilot tones on the channels can be measured to provide better regulation.

It is also previously known (see GB 2 294 170) to control, in various variants, the amplifier by measuring the total optical power at the amplifier output and compare it to a reference voltage. This provides a feedback signal which controls the amplifier. Additionally, the number of channels can be counted and the regulation be adjusted with the aid thereof.

It is also known (see U.S. Pat. No. 4,991,229) to control an optical amplifier by measuring the power of only one wavelength channel. This is done by filtering out the channel with the aid of a WDM coupler and detecting it. Otherwise the feedback control is effected as described above.

DESCRIPTION OF THE INVENTION

One problem with previously known technology for controlling the output power from an optical amplifier by only counting the number of channels, is that the number of channels is only a rough measure of the output power of the amplifier. Another problem is that when a pilot tone is modulated on data in a wavelength channel, the system becomes much more sensitive to disturbances, since the "ones" and "zeros" are affected and data can possibly be lost.

In EP 0 637 148 A1 it is indicated that the amplitudes of the superimposed pilot tones could be measured. The problem with this measuring method is that it can be difficult to measure the amplitudes on all channels at the same time. Furthermore it can be difficult and take a long time to measure a small amplitude which the pilot tone has when it is superimposed on another signal.

One problem in measuring the total power at the output of the amplifier is that the number of channels must also be counted.

One problem with measuring the optical power on only one channel at the amplifier output is that an expensive WDM coupler is required to filter out the channel.

One purpose with the present invention is to solve these problem by designating at least one channel solely for power control. At least one known check signal is sent thereon and its amplitude is measured. If several check signals are used, the mean value is taken.

The amplitude can be measured in various ways. A simple and inexpensive manner is to tap light from the amplifier output with a common optical coupler. The check signal, which in this case is sine signal or the like can be extracted by filtering with the aid of a narrow band filter, whereafter the amplitude is measured. The check signal can also conceiveably be a digital signal for example.

The advantages of this are that the measurements will be more rapid, more reliable and the transmitted data will not be disturbed. Another advantage is that the check signal can be given a double purpose, by putting it to some other use at some other location.

An additional problem with the previously known solutions is that pump lasers are still expensive. This is solved in an embodiment of the present invention by using a pump laser to serve at least two different amplifiers, while the control of the power of the amplifiers is taken care of by a separate blast laser for each amplifier. The ballast laser is then coupled via a multiplexer to the amplifier input and thus affects the input power of the amplifier and thereby indirectly its output power. The advantage of this is that it is less expensive.

In one embodiment of the ballast laser concept, a redundancy coupling is used. This is achieved by two amplifiers sharing together two pump lasers. Each pump laser can control either one or both of the amplifiers at the same time. The advantage of this is significantly higher fault security.

PREFERRED EMBODIMENTS

An optical amplifier can consist of an erbium doped optical fibre which is pumped by a high-power semiconductor laser or the like, called pump laser below.

Figure 1:
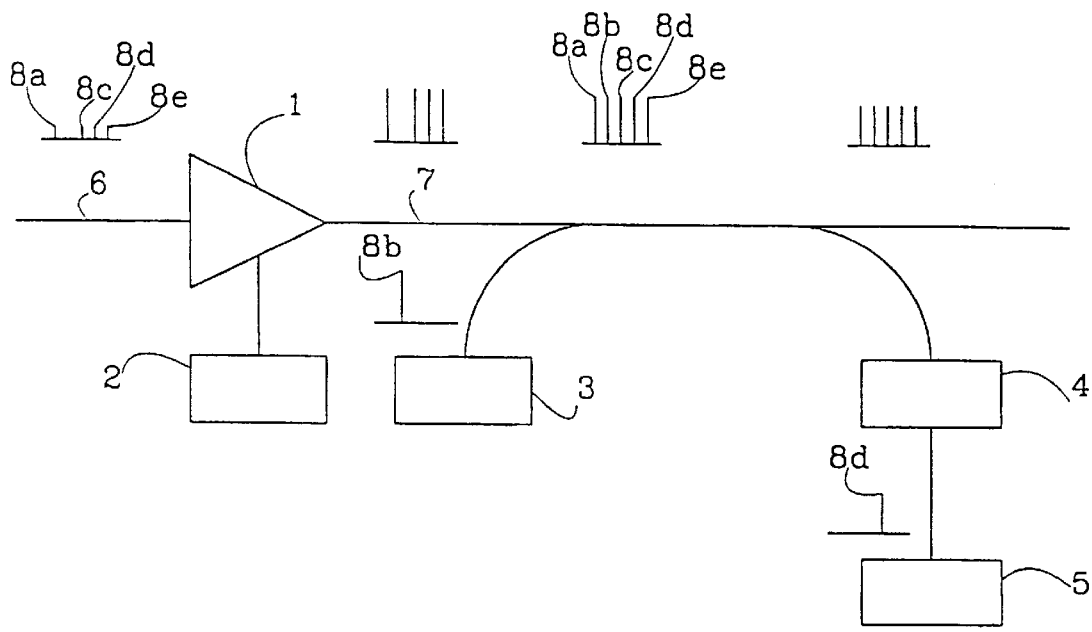
FIG. 1 shows a block diagram of an optical system optimised for five channels in accordance with the prior art.

FIG. 1 shows in accordance with prior art an optical system optimised for five channels 8a, 8b, 8c, 8d and 8e using wavelength division multiplexing. The system can be part of the telephone system for example. In the optical system, an optical amplifier 1 has constant output power. The amplifier 1 is controlled by a pump laser 2. An optical fibre 6 leads into the amplifier 1 from other nodes in the system and an optical fibre 7 leads from the amplifier 1 to other nodes in the system. In the fibre 6, 7 channels can be added and dropped. In the example shown, four channels 8a, 8c, 8d, 8e come through the first fibre 6 into the amplifier 1, are amplified and exit in the second fibre 7. An additional channel 8b is thereafter added from a transmitter 3. All of the channels 8a, 8b, 8c, 8d, 8e will then be of the same strength and one selected channel 8d can be read by a filter 4 selecting the specific wavelength of the selected channel 8d and sending it on to a receiver 5. All of the channels 8a, 8b, 8c, 8d, 8e decrease in strength the farther they travel, but since they are of equal strength there is no problem in reamplifying them.

Figure 2:
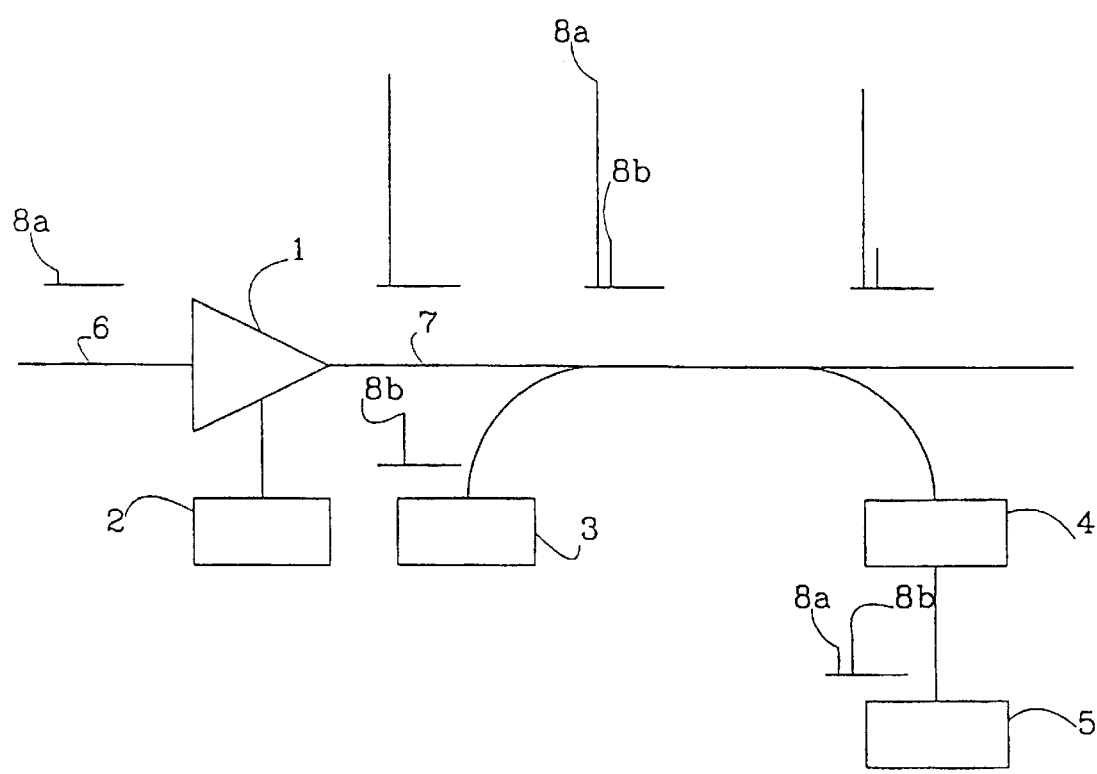
FIG. 2 shows a block diagram of the same system as in FIG. 1, but with only two channels present.

FIG. 2 shows the same system as in FIG. 1. In this case the system is still optimised for five channels, but only a first channel 8a comes into the amplifier 1. This single channel 8a will then become approximately four times as strong as if there had been four channels which had been amplified. This is due to the fact that the total output power from an optical amplifier is in principal constant, i.e. the output power depends actually primarily on the output power from the pump laser 2 coupled to the amplifier and less on the input power to the amplifier 1.

When a second channel 8b is then added the channels 8a and 8b will not be as strong, which results in problems. The filter 4 is in practice not ideal, so when the filter 4 attempts to select out the second channel 8b, the first channel 8a will predominate since it is so strong and cross talk can occur.

It is thus very desirable to be able to control the output power of the amplifier 1 channels.

Figure 3:
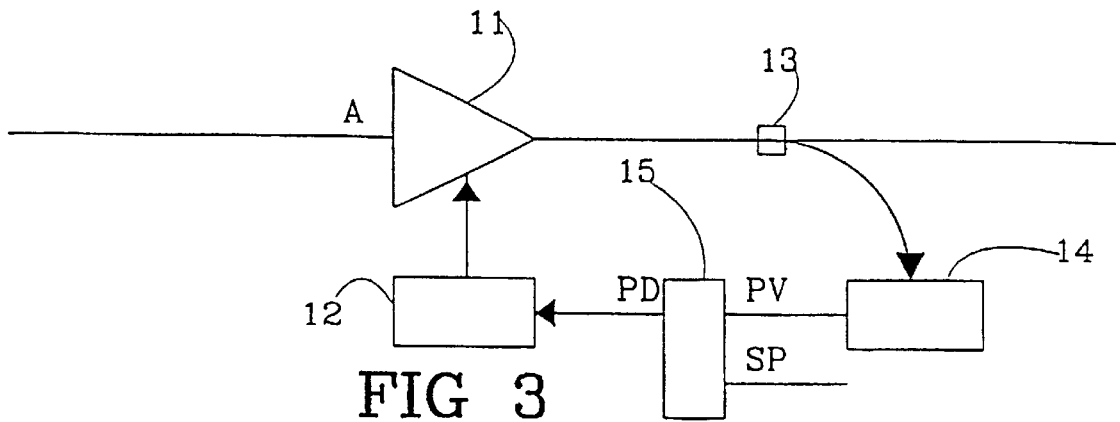
FIG. 3 shows a block diagram of one embodiment of the present invention, where an amplifier is controlled via a pump laser.

Since the output power from an optical amplifier depends primarily on the output power from the pump laser coupled to the amplifier, it is possible according to the invention to solve the above problems by controlling the pump laser in the manner shown in FIG. 3. An optical amplifier 11 is controlled by a pump laser 12. In order to control the channel output power of the amplifier 11, a feedback control circuit is used, which functions by measuring the channel output power of the optical amplifier 11 and providing a process value PV. In a controller 15 the process value PV is compared to a desired channel output power, i.e. a set point SP which, in accordance with the programming of the controller 15, emits a process demand signal PD which controls, via the pump laser 12 the channel output power of the amplifier 11 so that it approaches the desired output. This adjustment does not of course take place instantaneously. When the process demand signal PD via the pump laser 12, changes the channel output power of the amplifier 11, the conditions may already have been changed, which would require a new measurement of the channel output power of the amplifier 11, thus providing a new process demand signal PD. This process takes place continually and a negative feedback control loop is created which, with a certain time delay, adjusts the channel output power of the amplifier 11 so that it is always in the vicinity of the desired value.

The controller 15 is a conventional PID controller (proportional-integrating-differentiating). In short, the three different terms of the controller 15 can be summarised as follows: a large proportional term results in increased speed of the controller, but also as a rule in decreased stability. The introduction of an integral term eliminates lasting error in the process demand signal, but decreases the stability the larger the term is. The introduction of a differentiation term can improve the stability, but the differentiation of noisy measurement signals can be difficult. Careful weighing of said terms is required depending on what requirements one places in the control.

A number of wavelength channels go through the amplifier 11. In at least one check signal channel, no data is transmitted. At least one known check signal A which is used to indicate the channel output power of the amplifier 11 is transmitted there. The check signal A can be a pilot tone, a digital signal or any other signal at all which can be checked.

An advantageous method of detecting the check signal(s) is by measuring the amplitude on the check signal channel (s). If several check signals A are used, a mean value of the amplitude is suitably used. Another method is to use a digital check signal A and read it. It is of course possible to have various check signals A travel in different check signal channels.

After the amplifier 11, light is tapped using an optical demultiplexor 13 and the light is transmitted to a detector block 14 and in the check signal channel(s) with the check signal A are read. The demultiplex 13 can be a WDM coupler, a common optocoupler or the like. A WDM coupler will provide, in comparison with a common optocoupler a better STN ratio from the detector block 14, since the data channels are deselected, but the WDM coupler is, on the other hand, more expensive. In order to improve the signal to noise ratio when a common optocoupler is used, an optical filter (not shown in the Figure) is coupled prior to the detector block 14.

Figure 4:
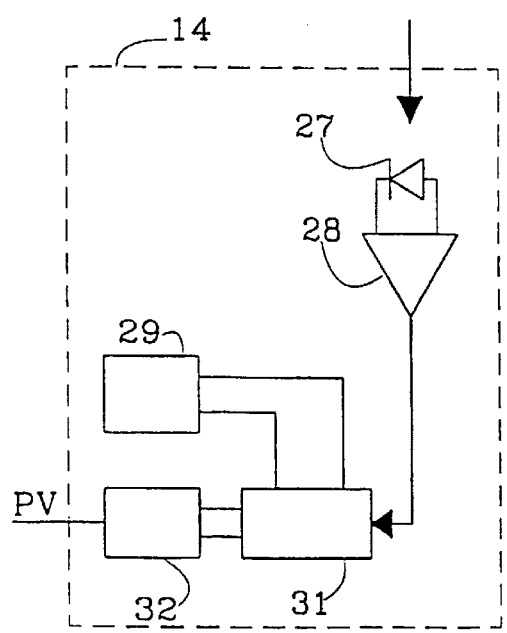
FIG. 4 shows a block diagram of a number of details in FIG. 3.

FIG. 4 shows how some details from the detector block 14 shown in FIG. 3 can be implemented. The amplitude is to be measured on two check signals which in this case are pilot tones and which are sent in the same channel.

The detector block 14 has a FIG. 4 a photodiode 27, a linear amplifier 28, an amplitude measurement block 31, a detector 32, and a tone generator 29.

The photodiode can be of the type PN (Positive-Negative) or PIN (Positive-Intrinsic-Negative). Light is tapped from the output of the optical amplifier 11 and is converted via a photodiode 27 and the linear amplifier 28 into a voltage which is measured in the amplitude measurement block 31.

The pilot tones can have frequencies lying between 50–60 kHz, with 6 kHz spacing for example. The tone generator 29 is used to provide reference signals for amplitude measurement by feeding in two sine waves or the like with frequencies which are 2 kHz higher than the pilot tones, i.e. within the range 52–62 kHz to the amplitude measuring block 31. The frequency difference between the pilot tone and its corresponding reference signal will then be 2 kHz, but other frequencies may arise and should be filtered out.

The amplitude measuring block 31, comprises two band pass filters of about 2 kHz and two amplitude meters, thus obtaining the amplitudes of the two pilot tones. The result is A/D converted and is fed into the detector 32, where the mean value of the two amplitudes is taken and an output power dependent process value PV is sent to the controller 15. The controller functions as described above and emits the process demand signal PD which indirectly controls the output power of the optical amplifier 11.

Figure 5:
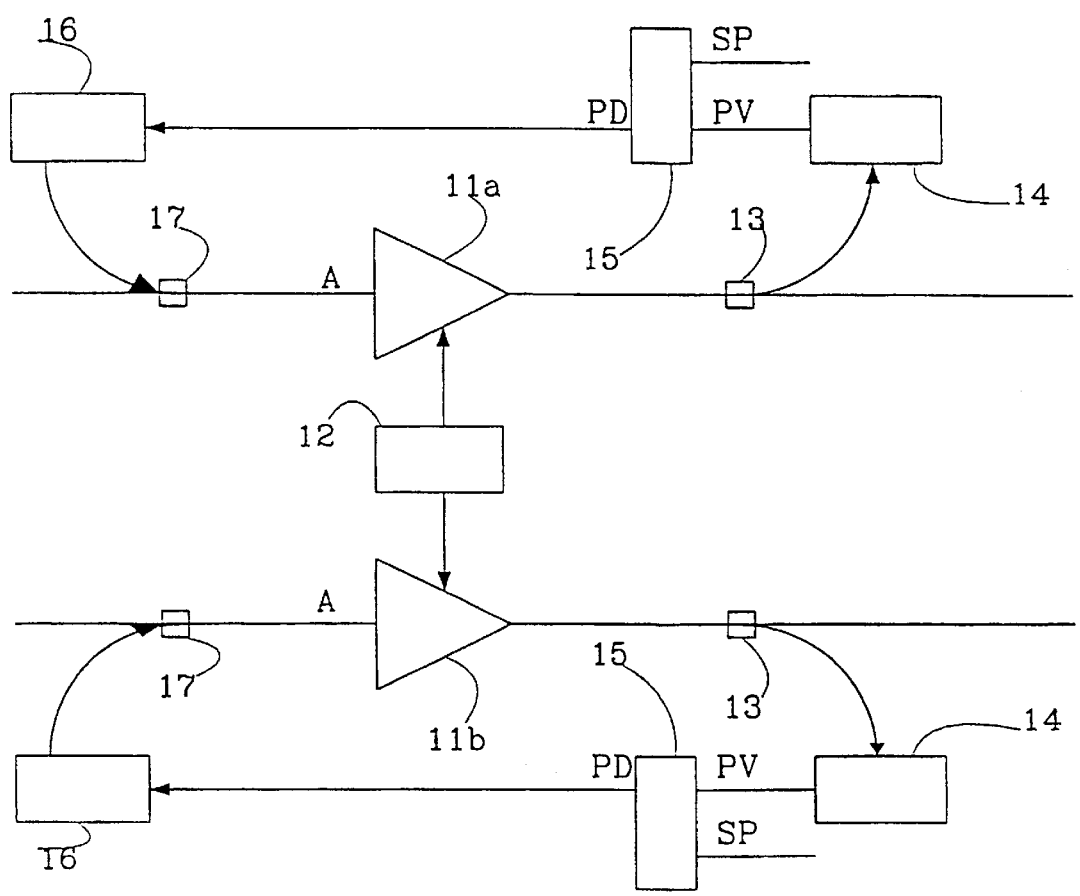
FIG. 5 shows a block diagram of one embodiment of the present invention where two amplifiers are controlled via ballast lasers.

Pump lasers are still rather expensive. One variant of the above described invention is shown in FIG. 5. In order to make it possible to pump in this case two optical amplifiers 11a and 11b using a single pump laser 12, the process demand signal PD is coupled from the controller 15 to a separate ballast laser 16, which is less costly than a pump laser. In this case it is the ballast laser which provides the control, while pump lasers are only used to pump the amplifier.

The ballast laser 16 has a wavelength different from the channel wavelength and the light of the ballast lasers 16 is multiplexed into the fibre to the input of the amplifier 11 via a multiplexor 17, which can be a WDM coupler, a common optocoupler or the like. The WDM coupler has theoretically a lower attenuation but it is probably most practical to use a common optocoupler. The coupling coefficient should preferably be low (1–15%) to avoid attenuation in the fibre.

If a number of amplifiers 11a or 11b are joined in sequence, the wavelength of the ballast laser must be filtered out. It can therefore be suitable to use the wavelength 1530 nm since many amplifiers already have 1530 nm filter included therein to surpress the amplifier peak in the amplifier.

It is of course also possible in the above described manner to allow a single pump laser to control more than two amplifiers. Otherwise the embodiment according to FIG. 5 functions in the same manner as that in FIG. 3.

Figure 6:
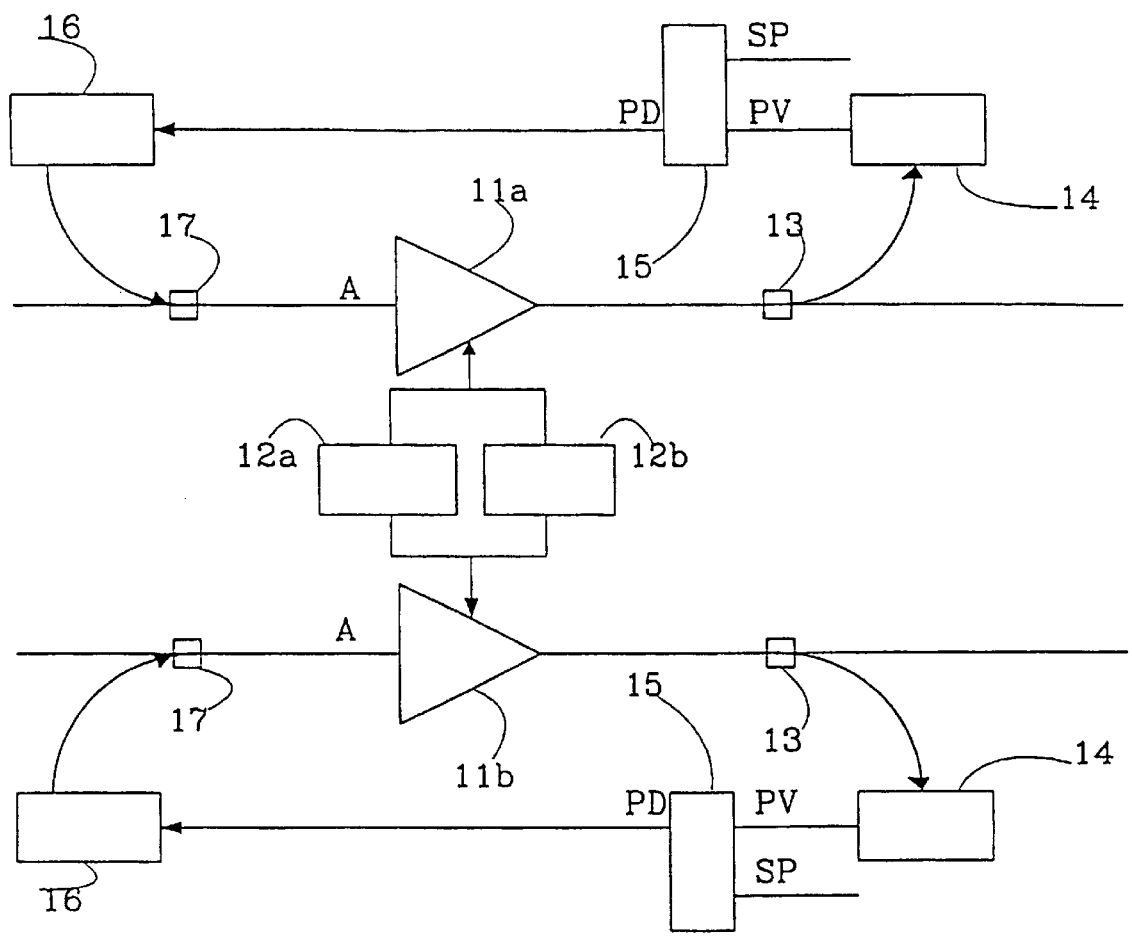
FIG. 6 shows a block diagram of one variant of FIG. 5, where two pump lasers are redundancy coupled.

A ballast laser 16 can also be used if one wishes to increase security, which is shown in FIG. 6. The coupling is the same as in FIG. 5 with the exception that two pump lasers 12a and 12b are used. These are redundancy coupled so that the two amplifiers 11a and 11b share together the pump lasers 12a and 12b. The advantage of this is that if one of the pump lasers 12a or 12b should break down, the amplifiers 11a and 11b will still function by virtue of the fact that the remaining pump laser doubles its pumping power.

In this embodiments as well it is also conceivable to use more amplifiers and pump lasers.

When using pump lasers, other known methods can of course by used as well for reading the check signal. For example, the total power on at least one predetermined channel can be measured. Another method is to modulate one or more check signals A on the signals in all channels and then measure the amplitude of the check signals A. This can however disturb the transmission of data in the channels and since the check signal amplitude in that case will be smaller, it is more difficult to measure than when the check signal has its own channel.

As an alternative method of measuring the output power of the amplifier 11, it is also conceivable to not use any check signal at all, but instead have a means for counting the channels and then measuring the total output power from the amplifier 11. The total output power is then divided by the number of channels. To only count the number of channels without at the same time measuring the output power only provides a rough measure of the output power of the amplifier 11.

In the embodiments described above, the feedback is always done by tapping light off at the output of the amplifier. If light is instead tapped off at the input of the amplifier there will be feed-forward control. Feed-forward control requires much greater knowledge of the performance of the system than feedback since one cannot see the result and feed-forward is therefore more difficult to implement. If feedback is more reliable, then feed-forward is on the other hand quicker. With precise measurements of the system it can be carried out. It can then be more advantageous to use a non-linear controller means instead of a conventional PID controller.

What is claimed is:

1. An optical system comprising:
   an optical amplifier including at least one input and one output;
   a control circuit, said control circuit controlling output power of the optical amplifier with the aid of a process demand signal from a control means,
   said control circuit including the control means, a detector block and a means for tapping light from the input or output of the optical amplifier to the detector block, wherein at least one check signal is sent in at least one check signal channel, said check signal channel arranged to pass said at least one check signal through the optical amplifier, and
   wherein the detector block is arranged to measure an amplitude of the at least one check signal.

2. The optical system of claim 1, wherein the light tapping means is disposed to produce, by filtering, the wavelength of the check signal.

3. The optical system of claim 1, wherein the light tapping means is a WDM coupler.

4. The optical system of claim 1, wherein an extra filter between the light tapping means and the detector block is disposed to produce, by filtering, the wavelength of the control signal.

5. The optical system of claim 1, wherein the detector block is disposed to produce by filtering, the frequency of the check signal.

6. The optical system of claim 4, wherein the detector block comprises a narrow band electrical filter.

7. The optical system of claim 6, wherein the narrow band electrical filter is disposed to read directly an amplitude of a frequency of the at least one check signal.

8. The optical system of claim 6, wherein the narrow band electrical filter is disposed to read an amplitude of a frequency difference between a frequency of the at least one check signal and a reference signal.

9. The optical system of claim 4, wherein the light tapping means is an optocoupler.

10. The optical system of claim 1, wherein at least two check signals are disposed to be used and wherein a mean value of signal amplitudes of the at least two check signals is determined.

11. The optical system of claim 1, wherein the output power of the optical amplifier per channel is controlled indirectly by the process demand signal by virtue of the fact that the optical amplifier is arranged to be controlled by a pump laser and by virtue of the fact that the pump laser is disposed to be controlled by the process demand signal.

12. The optical system of claim 1, wherein the output power of the optical amplifier per channel is controlled indirectly by the process demand signal by virtue of the fact that the optical amplifier is disposed to be controlled by a ballast laser coupled to the input of the optical amplifier via a multiplexor and by virtue of the fact that the ballast laser is disposed to be controlled by the process demand signal.

13. The optical system of claim 12, wherein at least two optical amplifiers are arranged to share a common pump laser.

14. The optical system of claim 13, wherein at least two optical amplifiers are arranged to share at least two common pump lasers and wherein the pump lasers are each disposed to be able to control one or more of the optical amplifiers.

15. The optical system of claim 1, wherein the at least one check signal is a pilot tone.

16. The optical system of claim 1, wherein the at least one check signal is a digital signal.

17. The optical system of claim 1, wherein the control means includes a controller with an input for a process value signal, an input for a set point signal and an output for the process demand signal, wherein the process value signal is disposed to depend on the output power of the optical amplifier and wherein the set point signal is disposed to set a desired output power from the optical amplifier.

18. The optical system of claim 1, wherein the process demand signal is a non-linear function of a process value signal.

19. A method for controlling output power of an optical amplifier comprising the steps of:

sending at least one check signal in at least one check signal channel through an optical amplifier;

tapping light from an input or output of the optical amplifier;

measuring an amplitude of the at least one check signal at a detector block;

feeding the process value signal a control means; and changing the output power of the optical amplifier based on a process demand signal from the control means.

20. The method of claim 19, wherein a set point signal is fed into the control means, said set point signal indicating a desired output power of the optical amplifier and wherein the process demand signal strives to reduce a difference between a process value signal and the set point signal.

21. The method of claim 19, wherein said step of tapping light further comprises the step of:

extracting, by filtering, a wavelength of the at least one check signal.

22. The method of claim 19, wherein a filter between a light tapping means and a detector block performs said step of extracting.

23. The method of claim 19, further comprising the step of:

extracting, by filtering, a frequency of the at least one check signal.

24. The method of claim 23, wherein a narrow band filter in the detector block extracts, by filtering, a difference in frequency between a frequency of the check signal and a reference signal.

25. The method of claim 19, wherein at least two check signals are used and wherein a mean value of the check signal amplitudes is determined.

26. The method of claim 19, wherein the process demand signal controls the optical amplifier by controlling a pump laser, which controls the optical amplifier.

27. The method of claim 19, wherein the process demand signal controls the optical amplifier by controlling a ballast laser, which controls the optical amplifier.

28. An optical system comprising:

an optical amplifier including at least one input and one output;

a control circuit for controlling output power of the optical amplifier including a controller, a detector block and a demultiplexor for tapping light from at least one input or output of the optical amplifier to the detector block, wherein at least one check signal is sent in at least one check signal channel, said check signal channel passes said at least one check signal through the optical amplifier; and wherein the detector block measures an amplitude of the at least one check signal.

29. The optical system of claim 28, wherein the demultiplexor for tapping light is disposed to produce, by filtering, the wavelength of the check signal.

30. The optical system of claim 29, wherein the demultiplexor for tapping light is a WDM coupler.

* * * * *